UNITED STATES PATENT OFFICE.

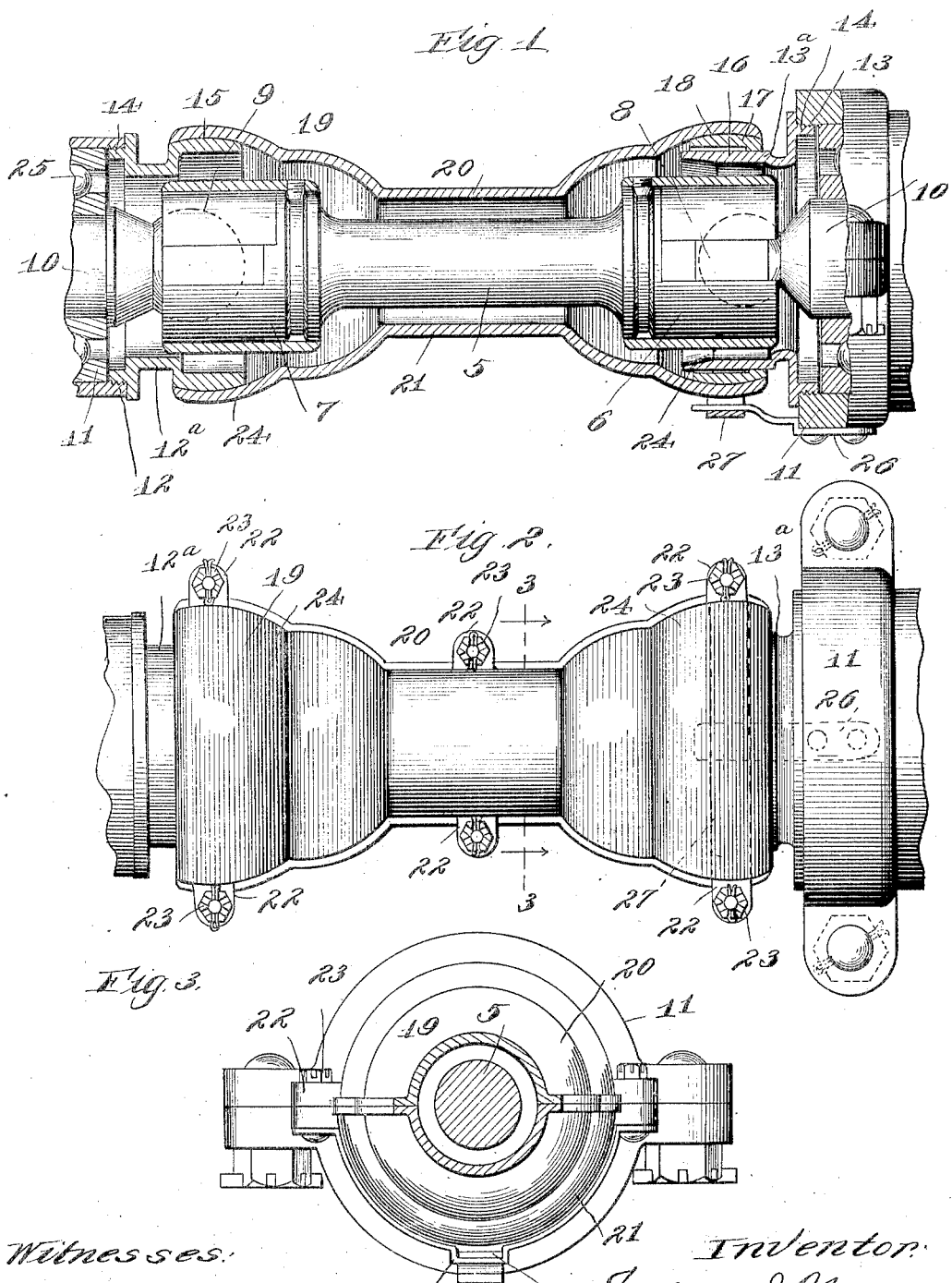

FREDERICK J. NEWMAN, OF CHICAGO, ILLINOIS.

UNIVERSAL-JOINT COUPLING.

1,009,778.   Specification of Letters Patent.   Patented Nov. 28, 1911.

Application filed March 2, 1909. Serial No. 480,865.

*To all whom it may concern:*

Be it known that I, FREDERICK J. NEW-MAN, a citizen of the United States, residing at Chicago, in the county of Cook and State of Illinois, have invented certain new and useful Improvements in Universal-Joint Couplings, of which the following is a specification.

The invention relates in general to universal-joint couplings, designed in particular to prevent the accumulation of grit, dust and other matter upon the joint and thereby wear the same, and secondly to provide a housing whereby any oil or lubricating material used upon the joint may be confined within the housing to prevent the scattering thereof and also to further assist in lubricating.

Referring now to the drawing, Figure 1 represents a longitudinal section of my improved housing with universal joint and shaft coupling therein. Fig. 2 is a top plan view of Fig. 1 with parts completed. Fig. 3 is a section on the line 3—3 of Fig. 2.

Referring now more particularly to the drawing, 5 is a universal joint shaft having socket joints 6 and 7 constituting one part of a ball and socket joint formed integral at either end thereof and adapted to coöperate with ball joints 8 and 9, which are connected to counter shafts 10 or to such other parts as may be desired. The counter shafts 10 have a bearing within the ball bearing casings 11.

The ball and socket joint construction herein shown is of a particular construction, constituting no part of this invention and need not, therefore, be described more in detail.

The outer ends of the bearing cases 11 are internally threaded as shown at 12 and 13 and to these ends are connected annular attaching or guard members 12$^a$ and 13$^a$ which are provided with threaded portions 14 adapted to coöperate with the interiorly threaded ends 12 and 13 of the ball bearing casings 11. The annular attaching or guard member 12$^a$ is provided with a parti-spherical surface 15, while the annular attaching or guard member 13$^a$ is provided with an annular flat surface 16 upon which is slidably mounted a ring 17 having a parti-spherical surface 18 similar to the surface 15 on the attaching member 12$^a$. The attaching members 12$^a$ and 13$^a$ are rigidly secured to the bearing casings and preferably project, for a short distance, over the universal joints.

The invention includes a housing or covering designated as a whole at 19, for these universal ball and socket joint members and universal joint shaft 5, preferably consisting of two parts 20 and 21 having integral registering lugs 22 formed thereon adapted to be secured together by means of the screws or bolts 23, or by any other well known means. The two parts of the housing are interiorly beveled at their outer ends, conforming to the beveled or curved surfaces 15 and 18, as shown at 24, to fit the beveled or curved end of the attaching member 12$^a$ and over the sliding collar 17 whereby when the two parts of the housing are mounted upon the attaching members and secured together a complete casing or housing will be formed for the universal joint connections that will exclude any dirt, dust or other matter therefrom. The movement of one of the universal joints relative to the other results in a slight increase of distance between the two attaching members and to provide for this movement the collar 17 is devised whereby if the universal joint member 8 moves relative to the universal joint member 9, the collar 17 may have a sliding movement on the flat surface 16 of the attaching member 13$^a$ whereby the universal joint coupling will have a free movement and still the dust and other matter will be excluded therefrom. The housing is preferably made in two parts and secured to the attaching members with the joint or meeting edges of the housing in a substantially horizontal position whereby any oil, grease, or other matter which may collect therein will not leak out. For this reason the housing also serves to retain all oil or grease, which otherwise would be lost, within the housing for the purpose of further lubricating the universal joint coupling. It can be plainly seen that with a housing of this character no dust or other matter can sift into the ball bearings 25 nor to any other of the moving parts of the joint.

As a means for preventing the possible movement or rotation of the housing relative to the attaching members, I provide a clip 26 secured to the ball bearing casing 11 in any suitable manner and adapted to project into a clip 27 secured to one part of the housing, whereby any relative rotating movement between the bearing casing and the housing is prevented.

The particular design or contour of the outer surface of the housing is immaterial, and in some instances it might not be necessary to employ the sliding ring 17 on the guard member 13ª.

Therefore without limiting the invention to the particular detailed construction herein shown and described, I claim:

1. In a universal-joint coupling, the combination of a pair of shafts, a universal-joint connection between the adjacent ends of said shafts, bearing casings for said shafts, attaching members secured to said bearing casings, one of said attaching members having a partially spherical surface thereon, a ring slidably mounted on the other of said attaching members and provided with a partially spherical surface, and a housing for said universal-joint connection between said attaching members and mounted upon one of said members and upon the ring of the other of said members with capacity for both angular and longitudinal movement relative thereto, substantially as described.

2. In a universal-joint coupling, the combination of a pair of shafts, a universal-joint connection between the adjacent ends of said shafts, bearing casings for said shafts, attaching members secured to said bearing casings, one of said attaching members having a partially spherical surface thereon, a ring slidably mounted on the other of said attaching members and provided with a partially spherical surface, a housing for said universal-joint connection between said attaching members and mounted upon one of said members and upon the ring of the other of said members with capacity for both angular and longitudinal movement relative thereto, and means for preventing relative rotation between said housing and said bearing casings, substantially as described.

3. In a universal-joint coupling, the combination of a universal-joint shaft, countershafts opposite the respective ends of said universal-joint shaft, universal joints between the opposed ends of said shafts, bearing casings for said counter-shafts, attaching members secured to said bearing casings, one of said attaching members having a partially spherical surface thereon, and a ring slidably mounted on the other of said attaching members and provided with a partially spherical surface, and a housing for said universal joints and universal-joint shaft between said attaching members and mounted upon one of said members and upon the ring of the other of said members with capacity for both angular and longitudinal movement relative thereto, substantially as described.

FREDERICK J. NEWMAN.

Witnesses:
MATTIE B. BLISS,
M. E. ADAMS.